(12) United States Patent
Anderson

(10) Patent No.: US 10,036,506 B1
(45) Date of Patent: Jul. 31, 2018

(54) REMOTE CONTROL LOCATION ASSEMBLY

(71) Applicant: Robert Anderson, Concord, CA (US)

(72) Inventor: Robert Anderson, Concord, CA (US)

( * ) Notice: Subject to any disclaimer, the term of this patent is extended or adjusted under 35 U.S.C. 154(b) by 0 days.

(21) Appl. No.: 15/671,781

(22) Filed: Aug. 8, 2017

(51) Int. Cl.
*A47F 5/00* (2006.01)
*F16M 11/04* (2006.01)
*G09F 17/00* (2006.01)
*F16B 47/00* (2006.01)

(52) U.S. Cl.
CPC ............ *F16M 11/04* (2013.01); *F16B 47/003* (2013.01); *G09F 17/00* (2013.01); *F16M 2200/08* (2013.01)

(58) Field of Classification Search
CPC ................................ G09F 17/00; H01H 9/025
See application file for complete search history.

(56) References Cited

U.S. PATENT DOCUMENTS

| | | | |
|---|---|---|---|
| 3,067,717 A * | 12/1962 | Imparato | G09F 17/00 116/173 |
| D326,432 S * | 5/1992 | McNulty | D12/223 |
| 5,192,042 A | 3/1993 | Wotring et al. | |
| 5,214,422 A * | 5/1993 | Cullimore | G08C 23/04 211/26.1 |
| 5,954,208 A * | 9/1999 | Schultz | H01H 9/025 174/535 |
| 6,349,667 B1 | 2/2002 | Rogers et al. | |
| 6,975,221 B2 * | 12/2005 | Monck | G08B 21/24 116/173 |
| 7,234,411 B1 * | 6/2007 | Butler | A42B 3/0406 116/173 |
| 9,371,118 B2 | 6/2016 | King et al. | |
| 2007/0169682 A1 | 7/2007 | Boyd | |
| 2007/0185968 A1 | 8/2007 | White et al. | |
| 2011/0290171 A1 | 12/2011 | Brick et al. | |
| 2011/0311760 A1 | 12/2011 | Berger | |

\* cited by examiner

*Primary Examiner* — Amy J. Sterling

(57) ABSTRACT

A remote control location assembly for locating a remote control includes a remote control that may be manipulated for remotely controlling an electronic device. A base is provided and the base is positioned on a support surface. A pole is coupled to the base and a flag is coupled to and extends laterally away from the pole. The flag enhances visibility of the base. An adhesive pad is positioned on the base. The adhesive pad adheres to the remote control when the remote control is positioned on the base. In this way the remote control is easily located when the remote control is not being used.

4 Claims, 4 Drawing Sheets

REMOTE CONTROL LOCATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to location devices and more particularly pertains to a new location device for locating a remote control.

BRIEF SUMMARY OF THE INVENTION

An embodiment of the disclosure meets the needs presented above by generally comprising a remote control that may be manipulated for remotely controlling an electronic device. A base is provided and the base is positioned on a support surface. A pole is coupled to the base and a flag is coupled to and extends laterally away from the pole. The flag enhances visibility of the base. An adhesive pad is positioned on the base. The adhesive pad adheres to the remote control when the remote control is positioned on the base. In this way the remote control is easily located when the remote control is not being used.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
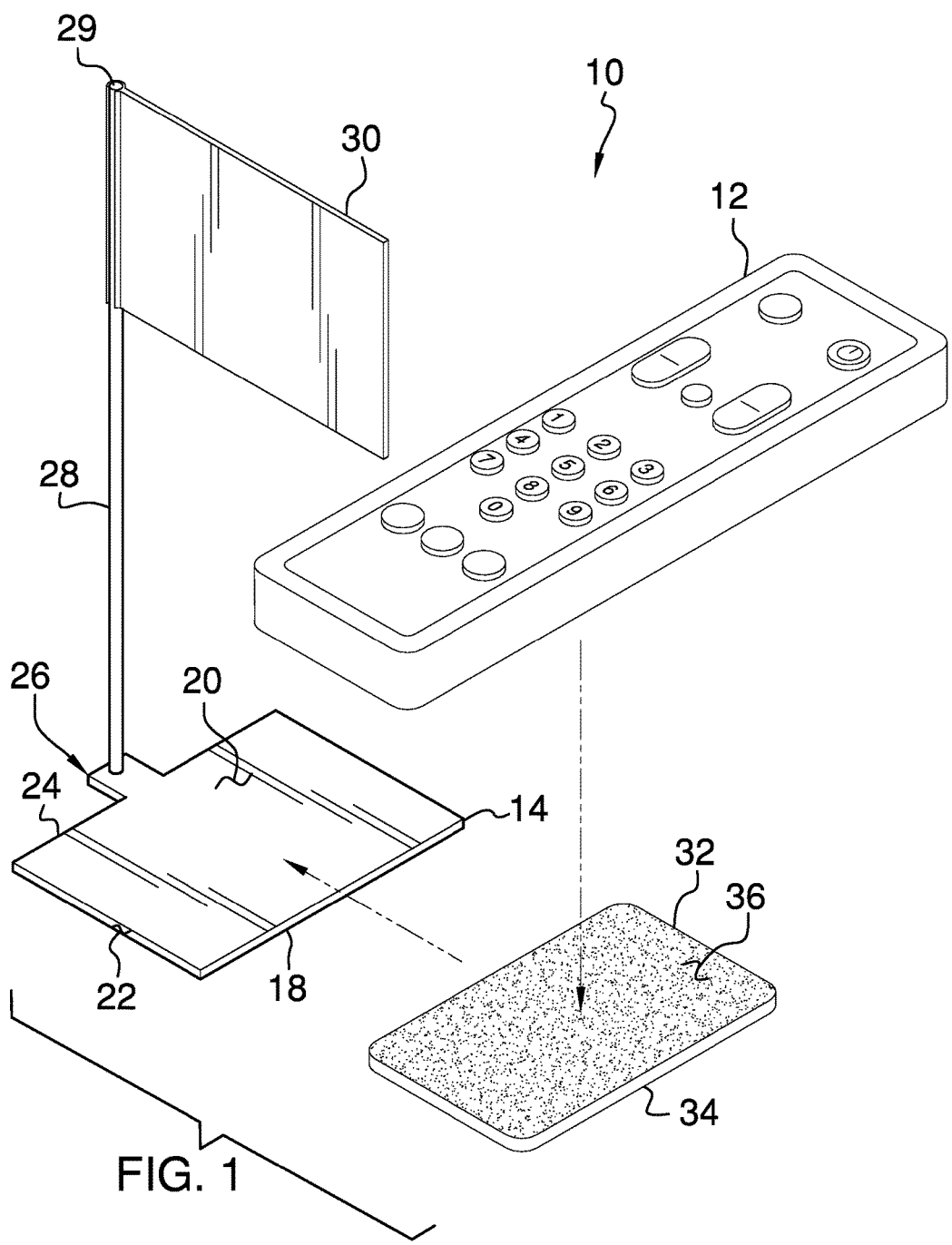
FIG. 1 is an exploded perspective view of a remote control location assembly according to an embodiment of the disclosure.
Figure 2:
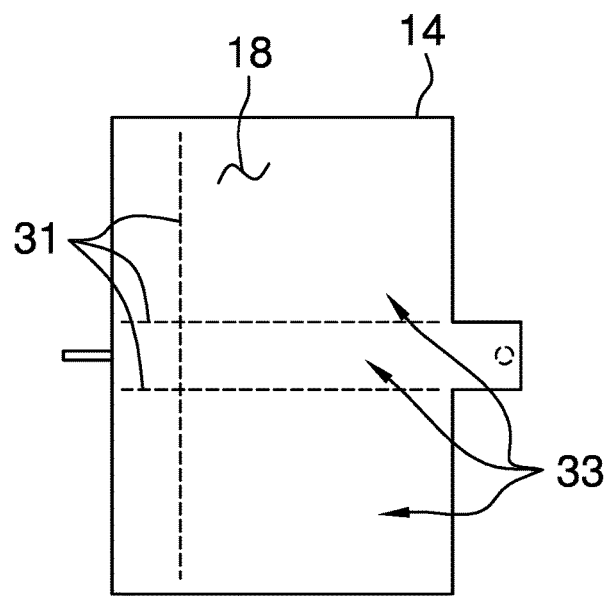
FIG. 2 is a bottom view of an embodiment of the disclosure.
Figure 3:
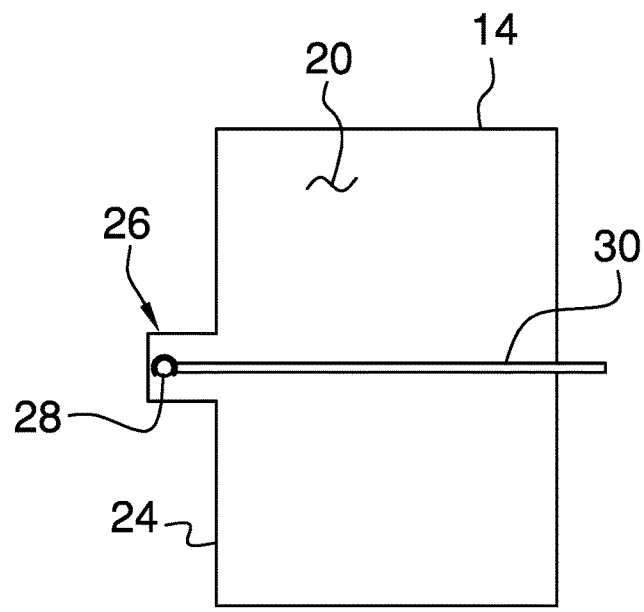
FIG. 3 is a top view of an embodiment of the disclosure.
Figure 4:
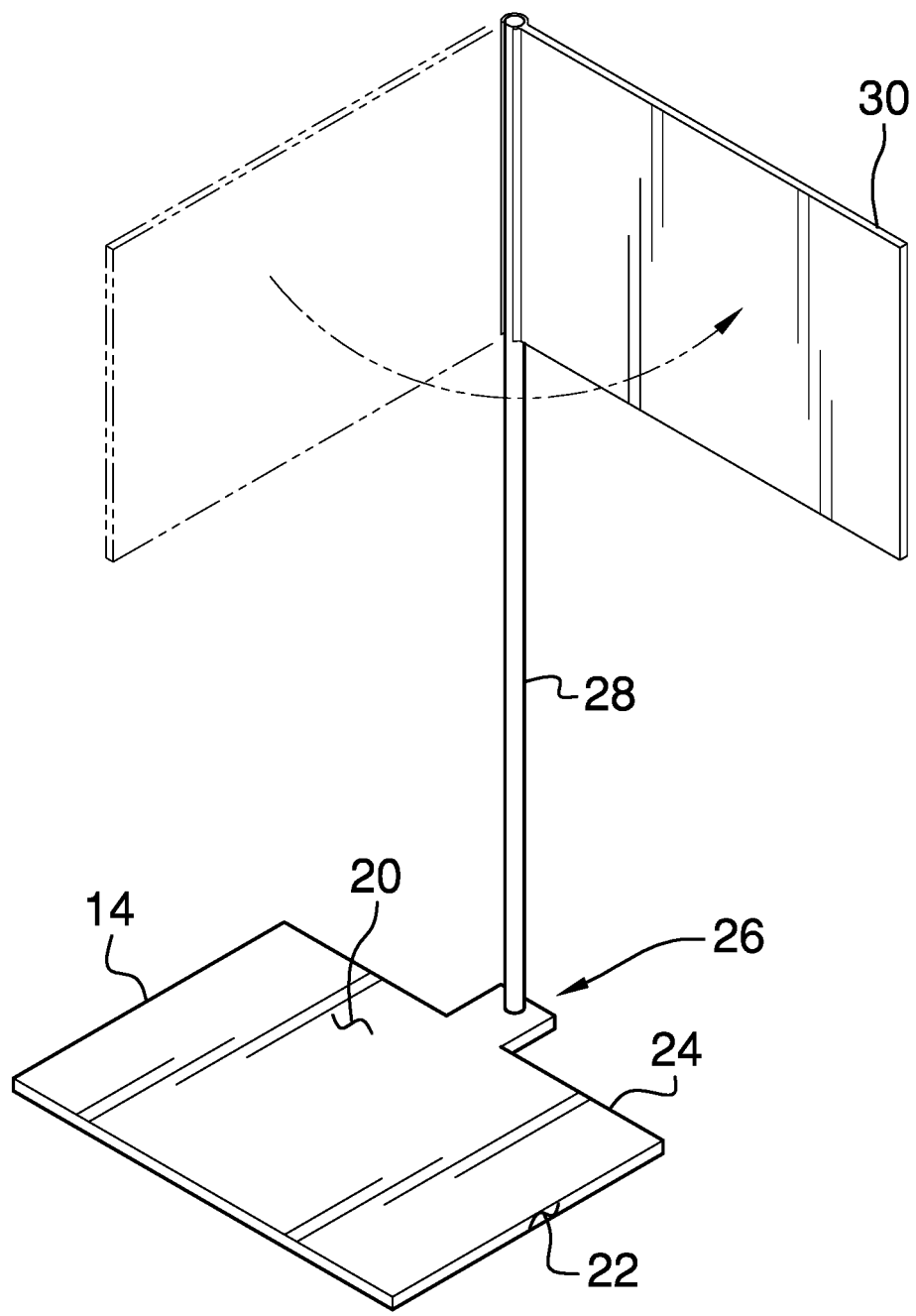
FIG. 4 is a perspective view of an embodiment of the disclosure.
Figure 5:
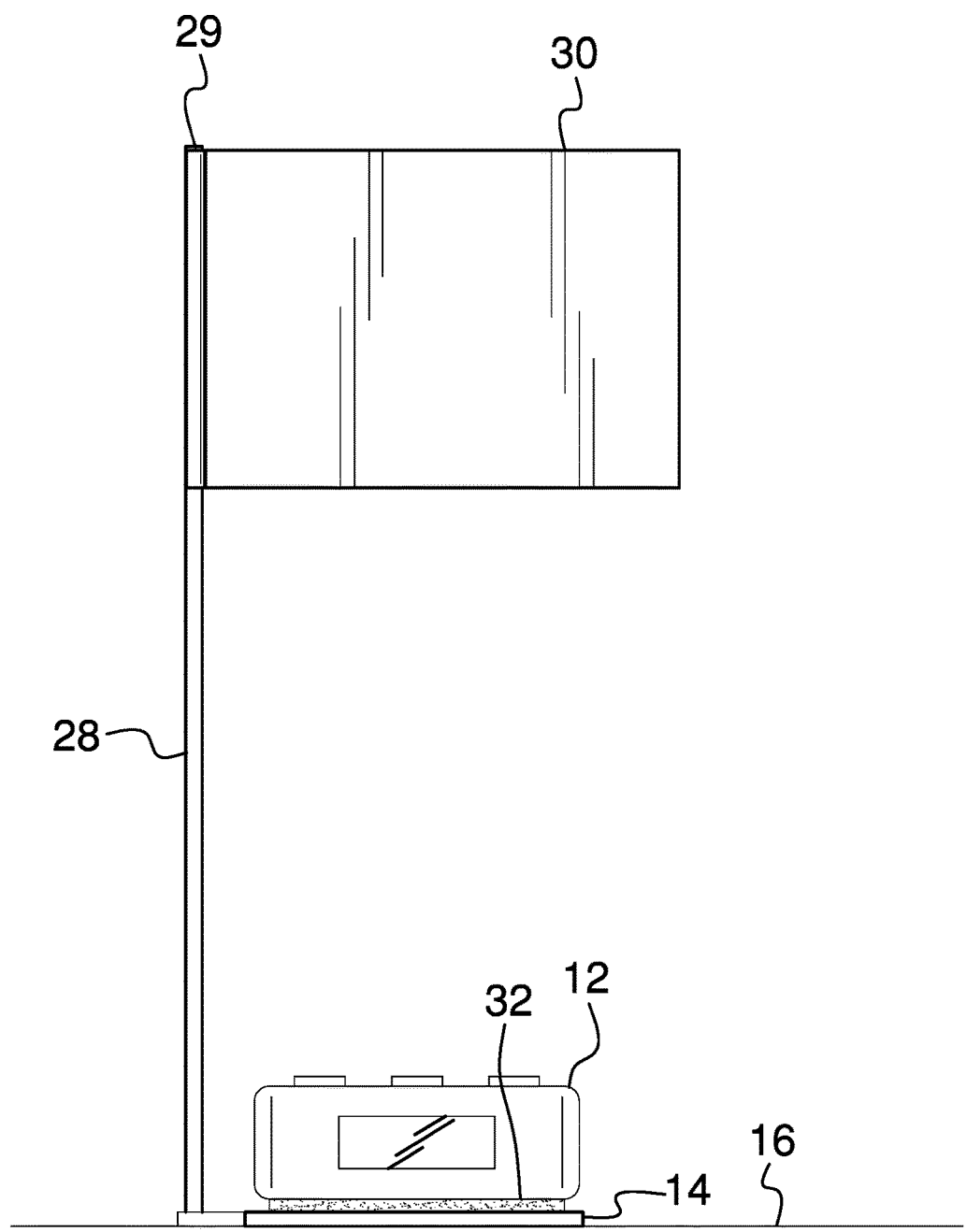
FIG. 5 is a perspective in-use view of an embodiment of the disclosure.

With reference now to the drawings, and in particular to FIGS. 1 through 5 thereof, a new location device embodying the principles and concepts of an embodiment of the disclosure and generally designated by the reference numeral 10 will be described.

As best illustrated in FIGS. 1 through 5, the remote control location assembly 10 generally comprises a remote control 12 that is manipulated for remotely controlling an electronic device. The remote control 12 may be a television remote control 12 or the like. A base 14 is provided and the base 14 is positioned on a support surface 16 such as a table top or the like. The base 14 has a first surface 18, a second surface 20 and a peripheral surface 22 extending therebetween. The peripheral surface 22 has a first lateral side 24. The first lateral side 24 has a prominence 26 thereon and the first surface 18 abuts the support surface 16.

A pole 28 is rotatably coupled to the base 14 and the pole 28 is positioned on the second surface 20 corresponding to the prominence 26. The pole 28 has a distal end 29 with respect to the base 14. A flag 30 is coupled to and extends laterally away from the pole 28 to enhance visibility of the base 14. The flag 30 extends downwardly from the distal end 29 of the pole 28. A selected decal may be adhered to each side of the flag 30 for visually enhancing the flag 30. The pole 28 is urged to rotate when the flag 30 is manipulated to position the flag 30 at a selected point above the base 14.

The first surface 18 of the base 12 has a plurality of scores 31. Each of the scores 31 extends along the first surface 18 thereby defining a plurality of sections 33 on the base 12. The base 12 is selectively broken along a selected score 31 thereby facilitating a size of the base 12 to be selected. In this way the size of the base 12 may be manipulated to correspond to the size of the remote control 12.

An adhesive pad 32 is positioned on the base 14. The adhesive pad 32 adheres to the remote control 12 when the remote control 12 is positioned on the base 14. In this way the remote control 12 is retained on the base 14 to easily locate the remote control 12. The adhesive pad 32 has a first surface 34 and a second surface 36. The first surface 34 of the adhesive pad 32 adheres to the second surface 20 of the base 14. The second surface 36 of the adhesive pad 32 adheres to the remote control 12. The adhesive pad 32 may be comprised of a non-residual, multiple-use adhesive that is in a gel form. The adhesive pad 32 may be replaced when the adhesive pad 32 becomes dirty.

In use, the base 14 is placed at a selected location and the adhesive pad 32 is adhered to the base 14. The remote control 12 is placed on the adhesive pad 32 when the remote control 12 is not being used. In this way the remote control 12 is retained at the selected location thereby facilitating the remote control 12 to be easily located. The adhesive pad 32 is replaced when the adhesive pad 32 will no longer adhere to the remote control 12. The pole 28 is selectively rotated to position the flag 30 at a selected position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote control location assembly being configured to retain a remote control at a selected location thereby facilitating the remote control to be found, said assembly comprising:
    a remote control being configured to be manipulated for remotely controlling an electronic device;
    a base being configured to be positioned on a support surface, said base has a first surface, a second surface and a peripheral surface extending therebetween, said peripheral surface having a first lateral side, said first lateral side having a prominence thereon, said first surface being configured to abut the support surface, said first surface having a plurality of scores defining a plurality of sections on the base, said base being breakable along said scores wherein said scores are configured for customizing a size of said base to correspond to a size of said remote control;
    a pole being coupled to said base;
    a flag being coupled to and extending laterally away from said pole wherein said flag is configured to enhance visibility of said base; and
    an adhesive pad being positioned on said base, said adhesive pad adhering to said remote control when said remote control is positioned on said base.

2. The assembly according to claim 1, wherein said pole is positioned on said second surface corresponding to said prominence, said pole having a distal end with respect to said base.

3. The assembly according to claim 1, wherein said adhesive pad has a first surface and a second surface, said first surface of said adhesive pad adhering to said second surface of said base, said second surface of said adhesive pad adhering to said remote control.

4. A remote control location assembly being configured to retain a remote control at a selected location thereby facilitating the remote control to be found, said assembly comprising:
    a remote control being configured to be manipulated for remotely controlling an electronic device;
    a base being configured to be positioned on a support surface, said base having a first surface, a second surface and a peripheral surface extending therebetween, said peripheral surface having a first lateral side, said first lateral side having a prominence thereon, said first surface being configured to abut the support surface, said first surface having a plurality of scores defining a plurality of sections on the base, said base being breakable along said scores wherein said scores are configured for customizing a size of said base to correspond to a size of said remote control;
    a pole being coupled to said base, said pole being positioned on said second surface corresponding to said prominence, said pole having a distal end with respect to said base;
    a flag being coupled to and extending laterally away from said pole wherein said flag is configured to enhance visibility of said base, said flag extending downwardly from said distal end of said pole; and
    an adhesive pad being positioned on said base, said adhesive pad adhering to said remote control when said remote control is positioned on said base, said adhesive pad having a first surface and a second surface, said first surface of said adhesive pad adhering to said second surface of said base, said second surface of said adhesive pad adhering to said remote control.

* * * * *